US010541868B2

(12) United States Patent
Chou et al.

(10) Patent No.: US 10,541,868 B2
(45) Date of Patent: Jan. 21, 2020

(54) SYSTEM AND METHOD FOR AUTOMATICALLY UPDATING BIOS SETUP OPTIONS

(71) Applicant: QUANTA COMPUTER INC., Taoyuan (TW)

(72) Inventors: Yung-Fong Chou, Taoyuan (TW); Chung-Hung Tsai, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 191 days.

(21) Appl. No.: 15/442,271

(22) Filed: Feb. 24, 2017

(65) Prior Publication Data

US 2018/0248749 A1 Aug. 30, 2018

(51) Int. Cl.
*H04L 12/24* (2006.01)
*H04L 12/46* (2006.01)

(52) U.S. Cl.
CPC ........ *H04L 41/082* (2013.01); *H04L 12/4641* (2013.01); *H04L 41/0886* (2013.01)

(58) Field of Classification Search
CPC .................................................... H04L 41/082
See application file for complete search history.

(56) References Cited

U.S. PATENT DOCUMENTS

| 7,461,130 B1 | 12/2008 | AbdelAziz et al. |
| 2004/0205779 A1 | 10/2004 | Almeida et al. |
| 2005/0038988 A1* | 2/2005 | Himmel ............... G06F 9/4408 713/100 |
| 2008/0301408 A1* | 12/2008 | Kranich ............. G06F 9/30043 712/31 |
| 2012/0166764 A1* | 6/2012 | Henry ................ G06F 9/30076 712/43 |
| 2017/0109176 A1* | 4/2017 | Shih ...................... G06F 9/4416 |

OTHER PUBLICATIONS

Extended European Search Report for EP Application No. 17178388. 9, dated Nov. 21, 2017.

* cited by examiner

*Primary Examiner* — Esther B. Henderson
(74) *Attorney, Agent, or Firm* — Nixon Peabody LLP; Zhou Lu

(57) ABSTRACT

The present disclosure provides a system and method for enabling an administrator or a controller to update BIOS setup options on a server system and then automatically update the BIOS setup options on other server systems in a baseboard management controller (BMC) virtual local area network (VLAN). For example, the method may comprise: receiving, at a specific controller of a node, a command to update the BIOS setup option; determining whether the specific controller is a master by checking an internal flag of the specific controller; in an event that the specific controller is neither a master or a slave, broadcasting a master request to the VLAN; determining whether a reply is received within a predetermined time period; in an event that the reply is not received, setting the internal flag of the specific controller as a master; and sending an original equipment manufacturer (OEM) completion response.

20 Claims, 7 Drawing Sheets

SYSTEM AND METHOD FOR AUTOMATICALLY UPDATING BIOS SETUP OPTIONS

FIELD OF THE INVENTION

The disclosure relates generally to system configuration update in a computing system.

BACKGROUND

Modern server farms or datacenters typically employ a large number of server systems to handle processing and storage needs for a variety of application services. Each server requires a basic input/output system (BIOS) to support normal operations. BIOS is a firmware that can ensure a server's computing components are functional. The BIOS stores firmware that is executed when the server is first powered on, along with a set of configurations specified for the BIOS. The BIOS typically recognizes, initializes, and tests hardware in the server system.

The BIOS settings sometimes need to be updated to ensure a server system functioning properly. For example, different BIOS settings are needed to support different configuration tests. However, there could be a large number of server systems that have the same BIOS settings in a datacenter. An operator has to change settings one by one on each of the group of servers. The process can be tedious and time-consuming.

SUMMARY

Systems and methods in accordance with various examples of the present disclosure provide a solution to the above-mentioned problems by enabling an administrator or a controller to update BIOS setup options on a server system and then automatically update the BIOS setup options on other server systems in a baseboard management controller (BMC) virtual local area network (VLAN). By enabling automatically updating BIOS setup options within the same BMC VLAN, the present disclosure provides a flexible, efficient and automated BIOS management method.

In accordance with one aspect of the present disclosure, a computer-implemented method for automatically updating a BIOS setup option, includes: receiving, at a specific controller of a node, a command to update the BIOS setup option; determining whether the specific controller is a master by checking an internal flag of the specific controller; in an event that the specific controller is neither a master or a slave, broadcasting a master request to the VLAN; determining whether a reply is received within a predetermined time period; in an event that the reply is not received, setting the internal flag of the specific controller as a master; and sending an OEM completion response.

In some configurations, the command is an OEM Intelligent Platform Management Interface (IPMI) command indicating the specific controller as a master that has a privilege to broadcast a BIOS setup option change of the corresponding node to VLAN. In some configurations, the specific controller can receive the command to update the BIOS setup option via a unified extensible firmware interface (UEFI) shell interface.

In accordance with one aspect of the present disclosure, a computer-implemented method for automatically updating a BIOS setup option, includes: saving updated setup option at a specific controller of a node in a VLAN; triggering a BIOS SMI function prior to resetting the node; causing a system management interrupt (SMI) handler to get variable(s) of BIOS setup option(s) and pass on the variables to the specific controller; determining whether the specific controller is a master by checking an internal flag of the specific controller; in an event that the specific controller is a master, broadcasting the updated setup option to the VLAN; setting the internal flag of the specific controller to none upon completion of broadcasting; and sending an OEM completion response to the SMI handler.

In some configurations, the variable(s) of BIOS setup option(s) includes UEFI variable(s). The variable(s) can be communicated from the SMI handler to the specific controller via an IPMI protocol.

In accordance with one aspect of the present disclosure, a computer-implemented method for automatically updating a BIOS setup option in a system, includes: powering on a node; receiving, at a specific controller of the node, updated setup option from a master controller of the system; overwriting an existing BIOS setup option on the node with the updated BIOS setup option; and continuing Power-On Self-Test (POST) on the node. In some configurations, the specific controller of the node can receive the updated setup option from the master controller via an IPMI protocol.

In accordance with another aspect of the present disclosure, a non-transitory computer-readable storage medium storing instructions is provided, the instructions when executed by a processor causing the processor to perform operations including: receiving, at a specific controller of a node, a command to update the BIOS setup option; determining whether the specific controller is a master by checking an internal flag of the specific controller; in an event that the specific controller is neither a master or a slave, broadcasting a master request to the VLAN; determining whether a reply is received within a predetermined time period; in an event that the reply is not received, setting the internal flag of the specific controller as a master; and sending an OEM completion response.

According to some configurations, a specific controller of a node in the VLAN is a baseboard management controller (BMC). A storage device on the node can be configured to be accessed by the specific controller and a central processing unit (CPU) on a node. The storage device can be any storage medium configured to store program instructions or data for a period of time. It can be a shared memory between a service controller and the CPU. According to some examples, the storage device can be a flash drive, a random access memory (RAM), a non-volatile random-access memory (NVRAM), a read-only memory (ROM), an electrically erasable programmable read-only memory (EEPROM), or a mailbox register.

Although many of the examples herein are described with reference to utilizing a specific controller on a node, it should be understood that these are only examples and the present disclosure is not limited in this regard. Rather, any service controller that is independent from the main CPU can be utilized to automatically broadcast BIOS setup option(s) to a VLAN.

Additionally, even though the present disclosure uses an intelligent platform management interface (IPMI) as an example approach to share BIOS setup option(s) between different devices/components, the present disclosure is applicable to other protocols that can handle the data transmission described herein.

Additional features and advantages of the disclosure will be set forth in the description which follows, and, in part, will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION

Various examples of the present technology provide systems and methods for enabling an administrator or a controller to update BIOS setup options on a server system and then automatically update the BIOS setup options on other server systems in a baseboard management controller (BMC) virtual local area network (VLAN). The present disclosure can enable the BMC VLAN to achieve a flexible, efficient and automated BIOS management.

Figure 1A:
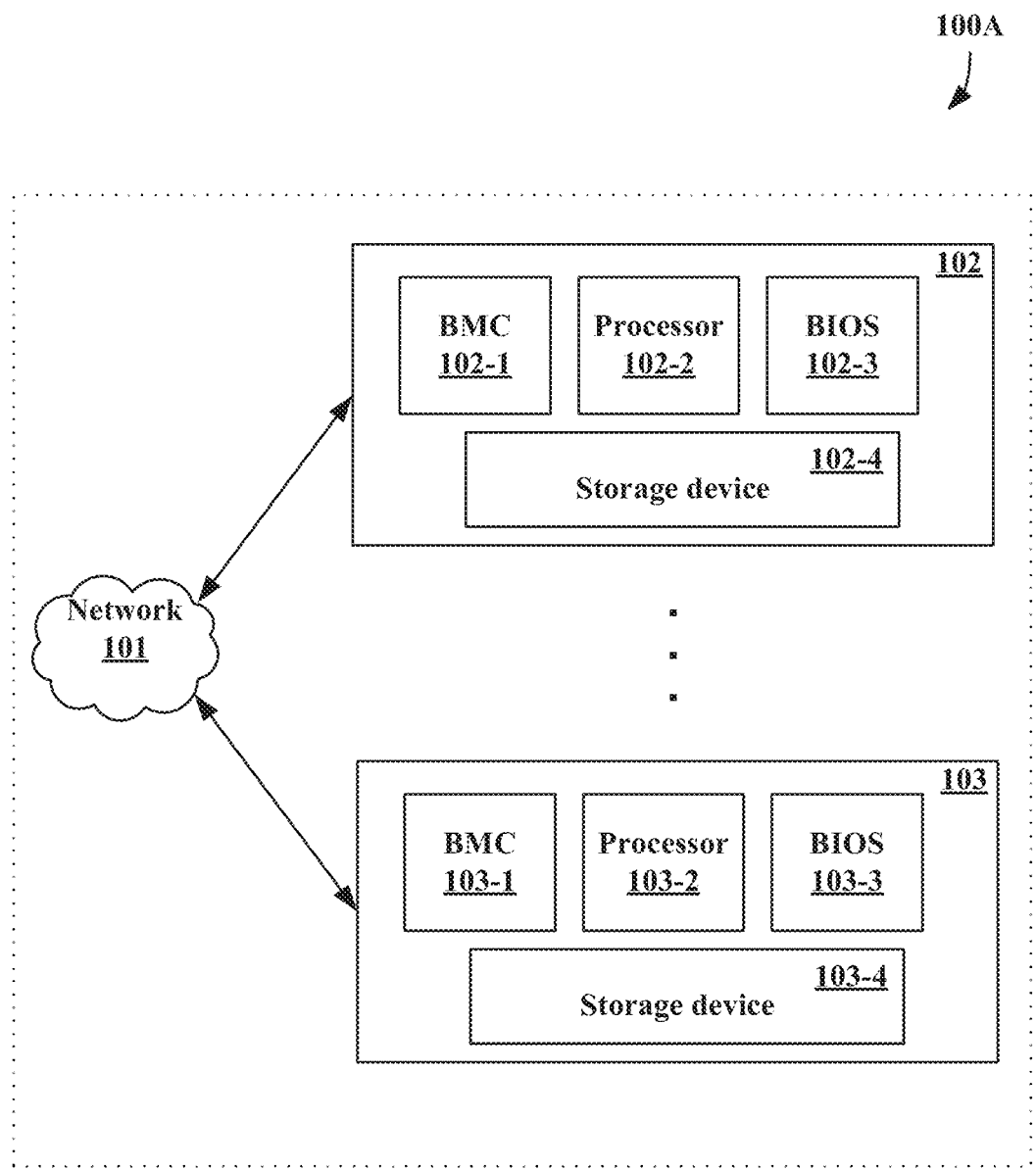
FIG. 1A is a schematic block diagram illustrating exemplary systems in a VLAN for automatically broadcasting BIOS setup option(s), in accordance with an implementation of the present disclosure.

FIG. 1A is a schematic block diagram illustrating exemplary systems in a VLAN 100A for automatically broadcasting BIOS setup option(s), in accordance with an implementation of the present disclosure. In this example, the VLAN 100A includes a plurality of server systems (e.g., 102, 103) and a network 101. The plurality of server systems may include any computing device operable to compute and process any form of data. For example, the plurality of server systems may include a personal computer, a network storage device, or a network computing device. The plurality of server systems (e.g., 102, 103) can communicate with each other through the network 101.

Each server system includes a plurality of components. For example, the server system 102 includes a BMC 102-1, a processor 102-2, a BIOS 102-3 and a storage device 102-4. The server system 103 includes a BMC 103-1, a processor 103-2, a BIOS 103-3 and a storage device 103-4.

In this example, the BMC (e.g., 102-1 and 103-1) in the VLAN 100A can communicate with each other through the network 101. The BMC (e.g., 102-1 and 103-1) can communicate with a corresponding processor (e.g., 102-2 and 103-2) and a corresponding storage device (e.g., 102-4 and 103-4) on a same server system via Intelligent Platform Management Interface (IPMI) messages using a system bus (e.g., Intelligent Platform Management Bus/Bridge (IPMB)). IPMB is an enhanced implementation of inter-integrated circuit ($I^2C$) bus and is a message-based, hardware-level basic interface specification. IPMB is intended for trusted internal communications and hence can be authentication-free. Although the BMC is illustrated in this example, other types of service controllers that are independent from a main central processing unit (e.g., a rack management controller) can be used to perform functions disclosed herein.

In some configurations, the BMC (e.g., 102-1 and 103-1) in the VLAN 100A can communicate with each other out-of-band when a corresponding server system is powered off. For examples, the BMC (e.g., 102-1 and 103-1) can communicate with each other out-of-band using a remote management control protocol (RMCP) or RMCP+ for IPMI over local area network (LAN).

The BIOS (e.g., 102-3 and 103-3) can be any program instructions or firmware configured to initiate and identify various components of corresponding server systems (e.g., 102 and 103). The BIOS is an important system component that is responsible for initializing and testing hardware components of a corresponding server system. The BIOS can provide an abstraction layer for the hardware components thereby providing a consistent way for applications and operating systems to interact with a peripheral device such as a keyboard, a display, and other input/output devices.

In some configurations, the BIOS (e.g., 102-3 and 103-3) can run system check prior to booting up an operating system (OS), e.g., the Microsoft Windows® OS, the Linux® OS, or any operating system, on a corresponding server system. The system check is a diagnostic system examination executed during initialization of the corresponding server system. An example of system check includes a Power-On Self-Test (POST). The BIOS can handle major functions of POST and may offload some duties to other programs designed to initialize specific peripheral devices (e.g., video and small computer system interface (SCSI) initialization). The major functions of POST may include: verifying CPU registers and the integrity of the BIOS code, checking basic components, examining system main memory, and passing control to other specialized BIOS extension. In some configurations, the BIOS may also handle additional POST's functions including: discovering, initializing, and cataloging all system buses and devices, providing a user interface for updating system's configuration, and constructing a system environment required by the operating system.

Quite often, the BIOS (e.g., 102-3 and 103-3) in the VLAN 100A requires to be updated. For examples, the BIOS can be updated to take advantages of new BIOS features released by the BIOS manufacture, to work with a newly added hardware, or to fix a bug detected in the BIOS.

In system 100A, a BIOS setup option can be updated or changed using a BIOS setup function on a particular server system of the plurality of server systems in the VLAN 100A. The updated BIOS setup option can be saved on a corresponding storage device (e.g., 102-4 and 103-4). Exiting the BIOS setup function on the particular server system can trigger a BIOS SMI function before a system reset. A SMI handler (not shown) can get variables (e.g., UEFI variables) for BIOS setup options and pass on the variables to a BMC (e.g., 102-1 and 103-1) of the particular server system via an IPMI protocol. The BMC of the particular server system can check an internal flag of the BMC to determine whether the BMC is a master that has a privilege to broadcast updated BIOS setup option to the VLAN 100A. In an event that the BMC is a master, the BMC can broadcast the updated BIOS setup option to the VLAN 100A. The BMC can then reset the internal flag to none and cause the particular server system to reset.

In system 100A, a storage device (e.g., 102-4 and 103-4) can be any storage medium configured to store program instructions or data for a period of time. The storage device can be a shared memory between corresponding BMC (e.g., 102-1 and 103-1) and processor (e.g., 102-2 and 103-2). In some configurations, the storage device can be an independent storage device. The storage device can be a flash drive, a random access memory (RAM), a non-volatile random-access memory (NVRAM), a read-only memory, or an electrically erasable programmable read-only memory (EE-PROM). The storage device is configured to store the system configurations such as BIOS data.

The processor (e.g., 102-2 and 103-2) can be a central processing unit (CPU) configured to execute program instructions for specific functions. For example, during a booting process, the processor can access BIOS data stored in a corresponding storage device (e.g., 102-4 and 103-4) and execute the BIOS (e.g., 102-3 and 103-3) to initialize corresponding server system. After the booting process, the processor can execute an operating system in order to perform and manage specific tasks for the corresponding server system.

Upon receiving an updated BIOS setup option from another BMC in the VLAN 100A, a BMC (e.g., 102-1 and 103-1) can store the updated BIOS setup option in the corresponding storage device (e.g., 102-4 and 103-4). In some configurations, the updated BIOS setup option is sent from the BMC to the corresponding storage device via IPMI messages. In some configurations, the BMC can cause a BIOS setup option of the corresponding BIOS (e.g., 102-3 and 103-3) to be replaced with the updated BIOS setup option.

When a particular server system (e.g., 102 and 103) is powered on or being reset, a corresponding processor (e.g., 102-2 and 103-2) can access the updated BIOS setup option stored in the corresponding storage device (e.g., 102-4 and 103-4) and execute updated BIOS setup option to initialize the particular server system. In some configurations, the processor can access the updated BIOS setup option via a system interface (e.g., I²C). After the booting process, the processor can execute an operation system in order to perform and manage specific tasks for the particular server system. In addition, the processor can implement at least one new function associated with updated BIOS setup option. For example, the updated BIOS setup option may include fixing a bug in the previous BIOS (e.g., 102-3 and 103-3).

Figure 1B:
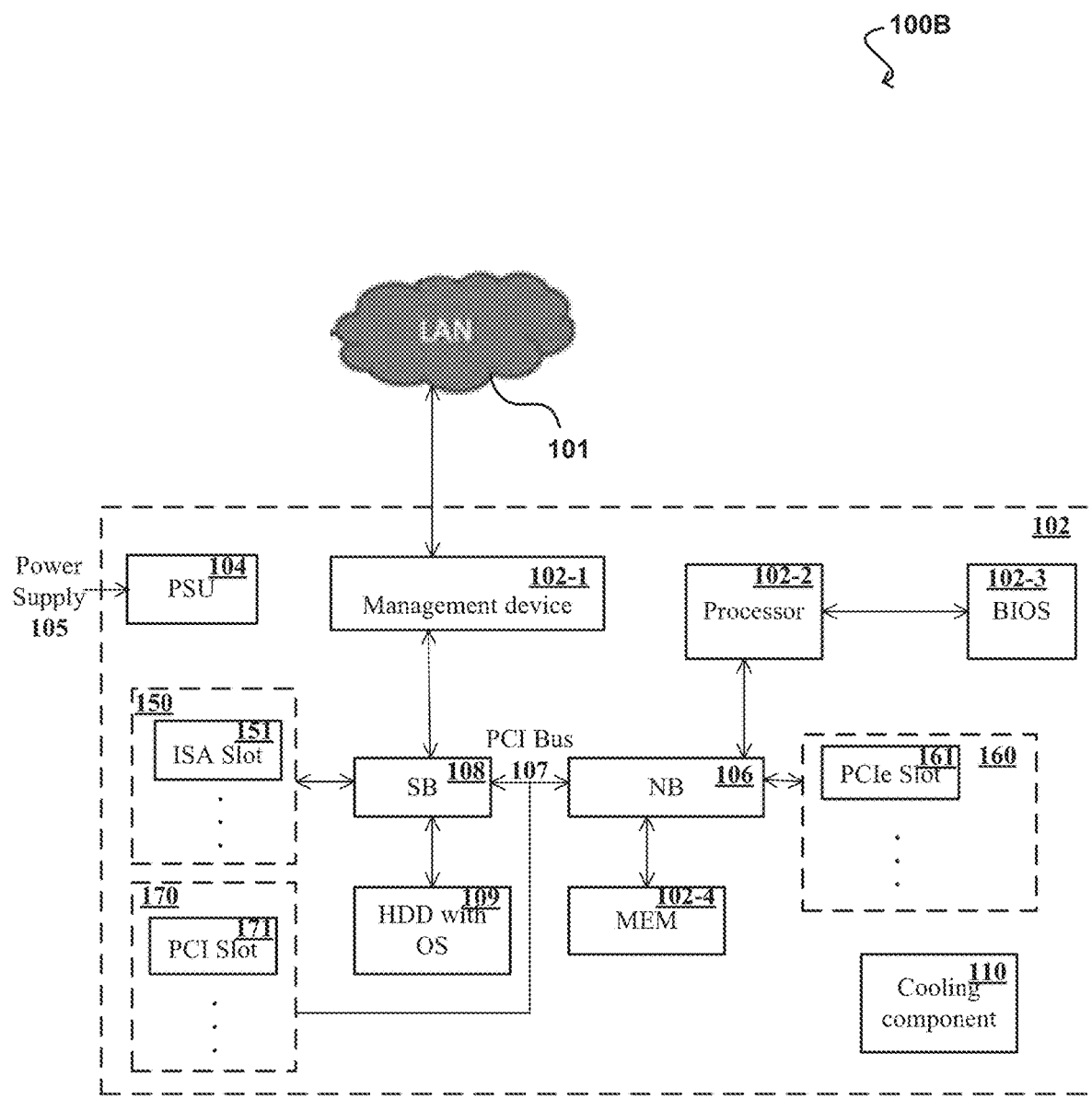
FIG. 1B is a schematic block diagram illustrating an exemplary system configured to automatically broadcast BIOS setup option(s) in accordance with an implementation of the present technology.

FIG. 1B illustrates a schematic block diagram of an exemplary system 100B configured to automatically broadcast BIOS setup option(s) in accordance with an implementation of the present technology. In this example, the server system 100B includes at least one microprocessor or processor 102-2, one or more cooling components 110, a main memory (MEM) 102-4, at least one power supply unit (PSU) 104 that receives an AC power from an AC power supply 105 and supply power to various components of the server system 100B, such as the processor 102-2, north bridge (NB) logic 106, PCIe slots 160, south bridge (SB) logic 108, storage device 109, ISA slots 150, PCI slots 170, and a management device 102-1. After being powered on, the server system 100B is configured to load software application from memory, computer storage device, or an external storage device to perform various operations. The storage device 109 is structured into logical blocks that are available to an operating system and applications of the server system 100B and configured to retain server data even when the server system 100B is powered off.

The memory 102-4 can be coupled to the processor 102-2 via the NB logic 106. The memory 102-4 may include, but is not limited to, dynamic random access memory (DRAM), double data rate DRAM (DDR DRAM), static RAM (SRAM), or other types of suitable memory. The memory 102-4 can be configured to store BIOS data of the server system 100B. In some configurations, BIOS data can be stored on the storage device 109.

In some configurations, the processor 102-2 can be multi-core processors, each of which is coupled together through a CPU bus connected to the NB logic 106. In some configurations, the NB logic 106 can be integrated into the processor 102-2. The NB logic 106 can also be connected to a plurality of peripheral component interconnect express (PCIe) slots 160 and a SB logic 108 (optional). The plurality of PCIe slots 160 can be used for connections and buses such as PCI Express x1, USB 2.0, SMBus, SIM card, future extension for another PCIe lane, 1.5 V and 3.3 V power, and wires to diagnostics LEDs on the server system 100B's chassis.

In system 100B, the NB logic 106 and the SB logic 108 are connected by a peripheral component interconnect (PCI) Bus 107. The PCI Bus 107 can support function on the processor 102-2 but in a standardized format that is independent of any of the processor 102-2's native buses. The PCI Bus 107 can be further connected to a plurality of PCI slots 160 (e.g., a PCI slot 161). Devices connect to the PCI Bus 107 may appear to a bus controller (not shown) to be connected directly to a CPU bus, assigned addresses in the processor 102-2's address space, and synchronized to a single bus clock. PCI cards can be used in the plurality of PCI slots 170 include, but are not limited to, network interface cards (NICs), sound cards, modems, TV tuner cards, disk controllers, video cards, small computer system interface (SCSI) adapters, and personal computer memory card international association (PCMCIA) cards.

The SB logic 108 can couple the PCI Bus 107 to a plurality of expansion cards or slots 150 (e.g., an ISA slot 151) via an expansion bus. The expansion bus can be a bus used for communications between the SB logic 108 and peripheral devices, and may include, but is not limited to, an industry standard architecture (ISA) bus, PC/104 bus, low pin count bus, extended ISA (EISA) bus, universal serial bus (USB), integrated drive electronics (IDE) bus, or any other suitable bus that can be used for data communications for peripheral devices.

In system 100B, the SB logic 108 is further coupled to a management device 102-1 that is connected to the at least one PSU 104. In some implementations, the management device 102-1 can be a baseboard management controller (BMC), rack management controller (RMC), or any other suitable type of system controller. The management device 102-1 is configured to control operations of the at least one PSU 104 and/or other applicable operations. In some implementations, the management device 102-1 is configured to monitor processing demands, and components and/or connection status of the server system 100B.

Although only certain components are shown within the exemplary systems 100A-100B in FIGS. 1A-1B, respectively, various types of electronic or computing components that are capable of processing or storing data, receiving or transmitting signals, or providing fresh air to downstream components can also be included in the exemplary systems 100A-100B. Further, the electronic or computing components in the exemplary systems 100A-100B can be configured to execute various types of application and/or can use various types of operating systems. These operating systems can include, but are not limited to, Android, Berkeley Software Distribution (BSD), iPhone OS (iOS), Linux, OS X, Unix-like Real-time Operating System (e.g., QNX), Microsoft Windows, Window Phone, and IBM z/OS.

Depending on the desired implementation for the exemplary systems 100A-100B, a variety of networking and messaging protocols can be used, including but not limited to TCP/IP, open systems interconnection (OSI), file transfer protocol (FTP), universal plug and play (UpnP), network file system (NFS), common internet file system (CIFS), Apple-Talk etc. As would be appreciated by those skilled in the art, the exemplary systems 100A-100B illustrated in FIGS. 1A-1B are used for purposes of explanation. Therefore, a network system can be implemented with many variations, as appropriate, yet still provide a configuration of network platform in accordance with various examples of the present technology.

In exemplary configurations of FIGS. 1A-1B, the exemplary systems 100A-100B can also include one or more wireless components operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections, as known in the art. Various other elements and/or combinations are possible as well within the scope of various examples.

The above discussion is meant to be illustrative of the principles and various examples of the present technology. Numerous variations and modifications will become apparent once the above disclosure is fully appreciated.

Figure 2A:
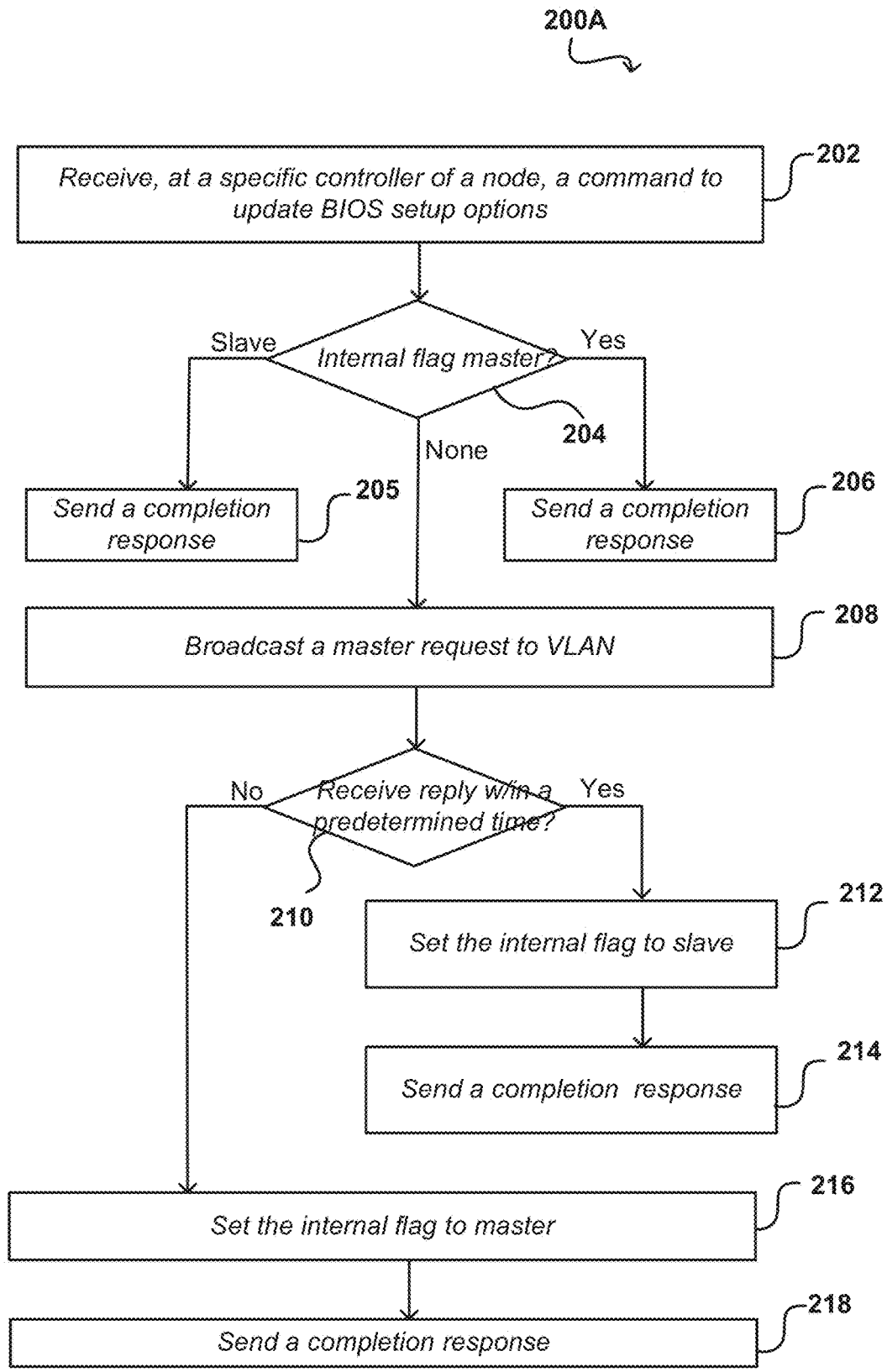
FIGS. 2A-2C are exemplary methods for automatically broadcasting BIOS setup option(s) in accordance with an implementation of the present disclosure.

FIG. 2A illustrates an exemplary method 200A for automatically broadcasting BIOS setup option(s) in a system including a plurality of nodes, in accordance with an implementation of the present technology. It should be understood that the exemplary method 200A is presented solely for illustrative purposes and that in other methods in accordance with the present technology can include additional, fewer, or alternative steps performed in similar or alternative orders, or in parallel. The exemplary method 200A starts with receiving, at a specific controller of a node, a command to update a BIOS setup option on the node, at step 202. The command may be from an administrator or a controller of the system. In some configurations, the command is an original equipment manufacturer (OEM) Intelligent Platform Management Interface (IPMI) command indicating the specific controller as a master that has a privilege to broadcast a BIOS setup option change to other nodes in the system. In some configurations, the node can provide a BIOS setup utility via a unified extensible firmware interface (UEFI) shell interface for an administrator to update the BIO setup option.

At step 204, the specific controller can check an internal flag to determine whether the specific controller is a master controller that has a privilege to broadcast the BIOS setup option change of the node to other node(s) of the system. In an event that the specific controller is a slave controller, the specific controller can send out a completion response (e.g., an OEM completion response), for example to the UEFI shell interface, to indicate that the specific controller cannot be a master controller for the time being, at step 205. In an event that the specific controller is a master controller, the specific controller can send out a completion response (e.g., an OEM completion response), for example to the UEFI shell interface, to indicate that the specific controller is already a master controller and is allowed to broadcast updated BIOS setup option on the node to other node(s) of the plurality of nodes, at step 206.

At step 208, the specific controller can broadcast a master request to the system. The specific controller can determine whether a response is received from other nodes of the plurality nodes of the system within a predetermined time period, at step 210. In some configurations, another node of the plurality of nodes responds to the master request from the specific controller only if the another node has an internal flag indicating that a controller of the another node is a master controller.

In an event that a response is received from another node of the plurality of nodes, the specific controller can set the internal flag to slave at step 212, i.e., to a value indicating it is available to operate as a slave controller. The specific controller sends out a completion response (e.g., an OEM completion response), for example to the UEFI shell interface, to indicate that the specific controller cannot be a master controller for the time being, at step 214.

In an event that no response is received from other node of the plurality of nodes within the predetermined time period, the specific controller can set the internal flag to master at step 216, i.e., to a value indicating it is available to operate as a master controller. The specific controller can send out a completion response (e.g., an OEM completion response), for example to the UEFI shell interface, to indicate that the specific controller is now a master controller and is allowed to broadcast updated BIOS setup option on the node to other node(s) of the plurality of nodes, at step 218.

Figure 2B:
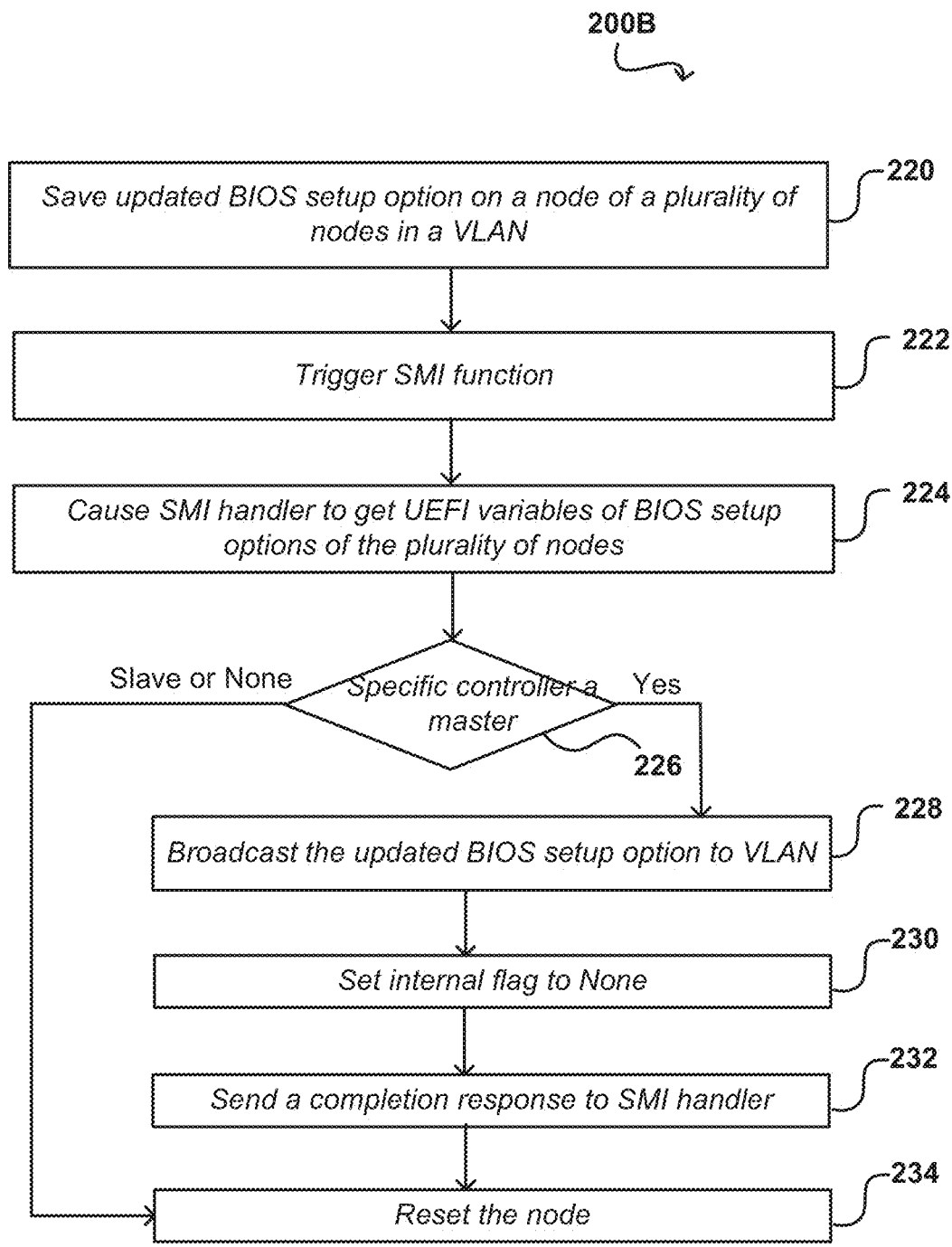

FIG. 2B illustrates an exemplary method 200B for automatically broadcasting BIOS setup option(s) in a system including a plurality of nodes, in accordance with an implementation of the present technology. The exemplary method 200B starts with saving updated BIOS setup option on a node of the plurality of nodes, at step 220. In some configurations, the node can provide a BIOS setup utility for an administrator to update the BIO setup option. After completion of updating BIOS setup option, exiting the BIOS setup utility can trigger a SMI function prior to resetting the node, at step 222.

At step 224, a SMI handler can get variables for BIOS setup options of the plurality of nodes and send the variables to a specific controller of the node. In some configurations, the variables are sent from the SMI handler to the specific controller via an IPMI protocol.

At step 226, the specific controller can check an internal flag to determine whether the specific controller is a master controller or not, e.g., whether the internal flag is set to master or slave. In an event that the specific controller is a master, the specific controller can broadcast the updated BIOS setup option to the other nodes of the plurality of nodes, at step 228. The specific controller can further reset the internal flag to none upon completion of broadcasting the updated BIOS setup option, at step 230. The specific controller can further send out a completion response (e.g., an OEM completion response), for example to the UEFI shell interface, to indicate that the updated BIOS setup option has been broadcasted, at step 232. The specific controller can further reset the node, at step 234.

In an event that the specific controller is not a master, the exemplary method 200B goes to the step 234, at which the specific controller can reset the node.

Figure 2C:
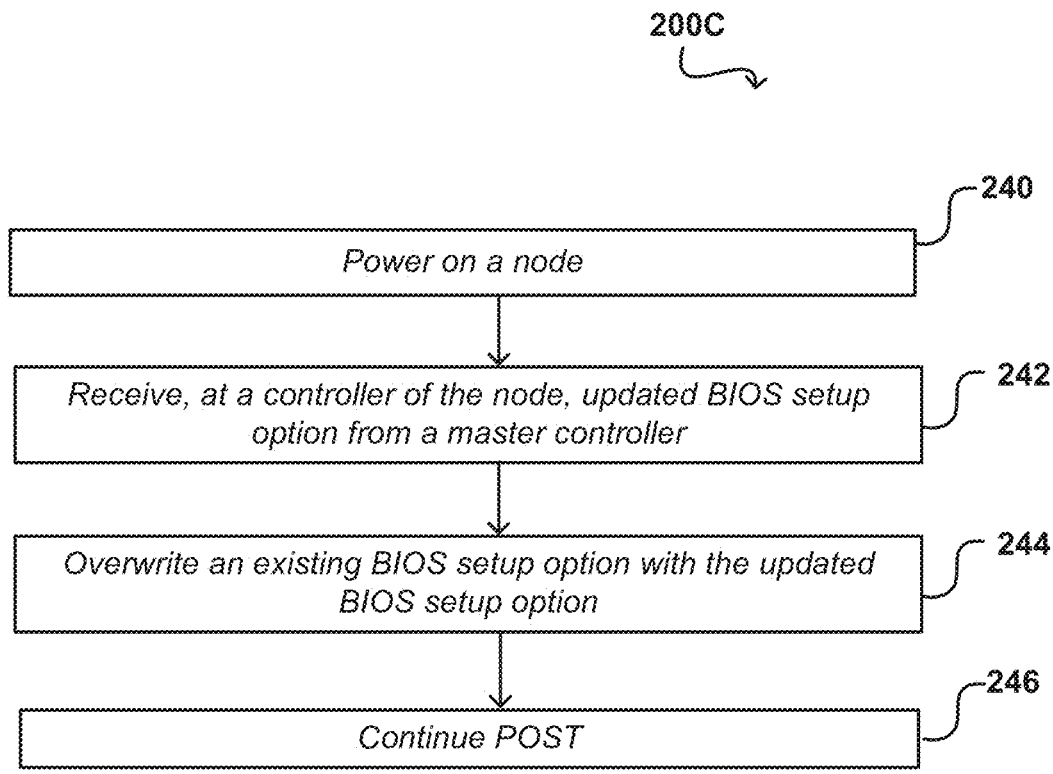

FIG. 2C illustrates an exemplary method 200C for automatically broadcasting BIOS setup option(s) in a system including a plurality of nodes, in accordance with an implementation of the present technology. The exemplary method 200C starts with powering on a node of the plurality of nodes, at step 240.

At step 242, a controller of the node receives updated BIOS setup option from a master controller of the system. The controller can cause POST of the node to get the updated BIOS setup option and overwrite an existing BIOS setup option on the node, at step 244. The controller can further cause the POST to continue on the node, at step 246.

Terminologies

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks can be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments, networks, devices, ports, physical or logical links, and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources can include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources can be used to support virtual networks, virtual machines (VM), databases, applications (Apps), etc.

Cloud computing resources can include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

Figure 3:
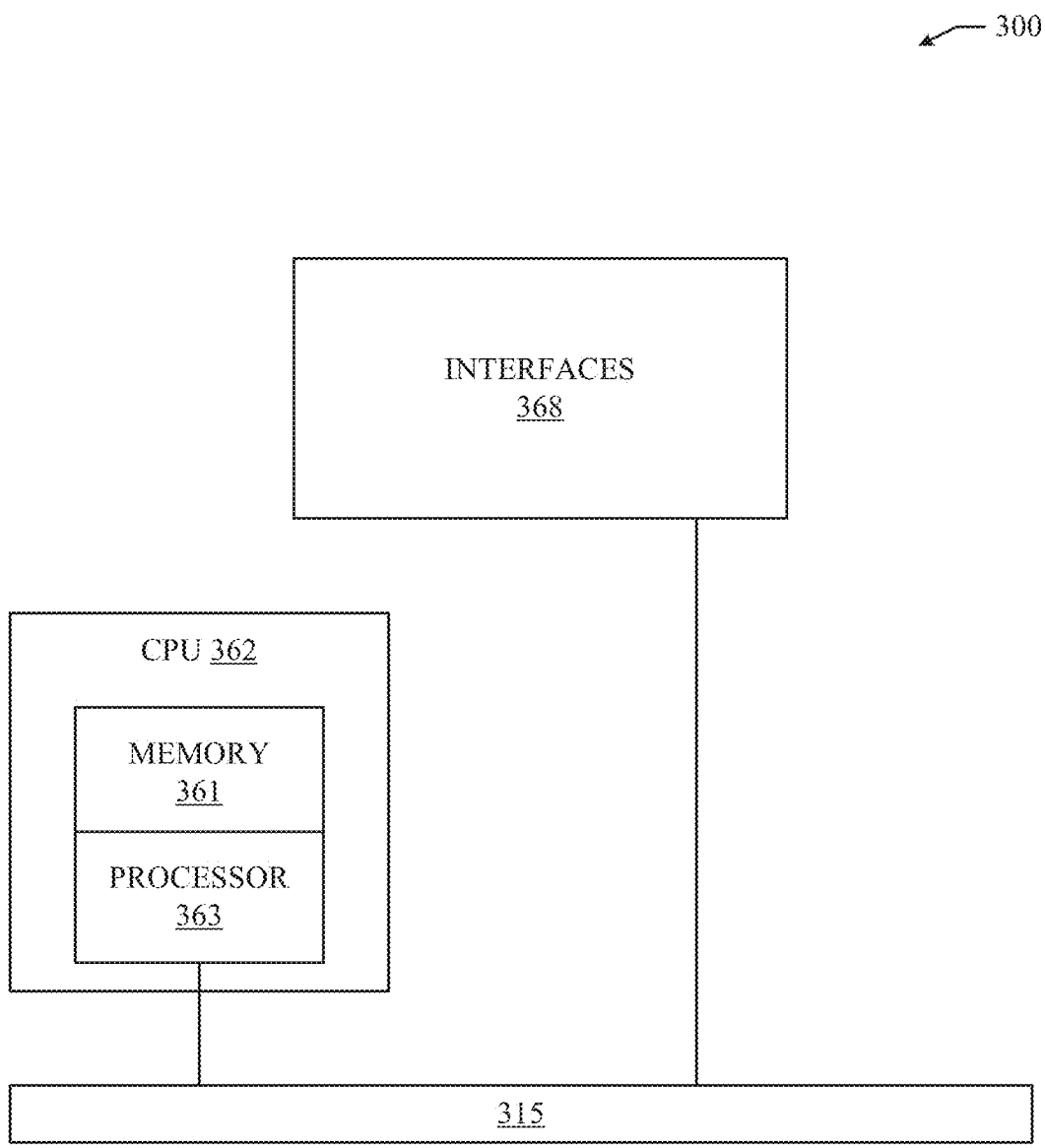
FIG. 3 illustrates an exemplary computing device in accordance with various implementations of the disclosure.
Figure 4:
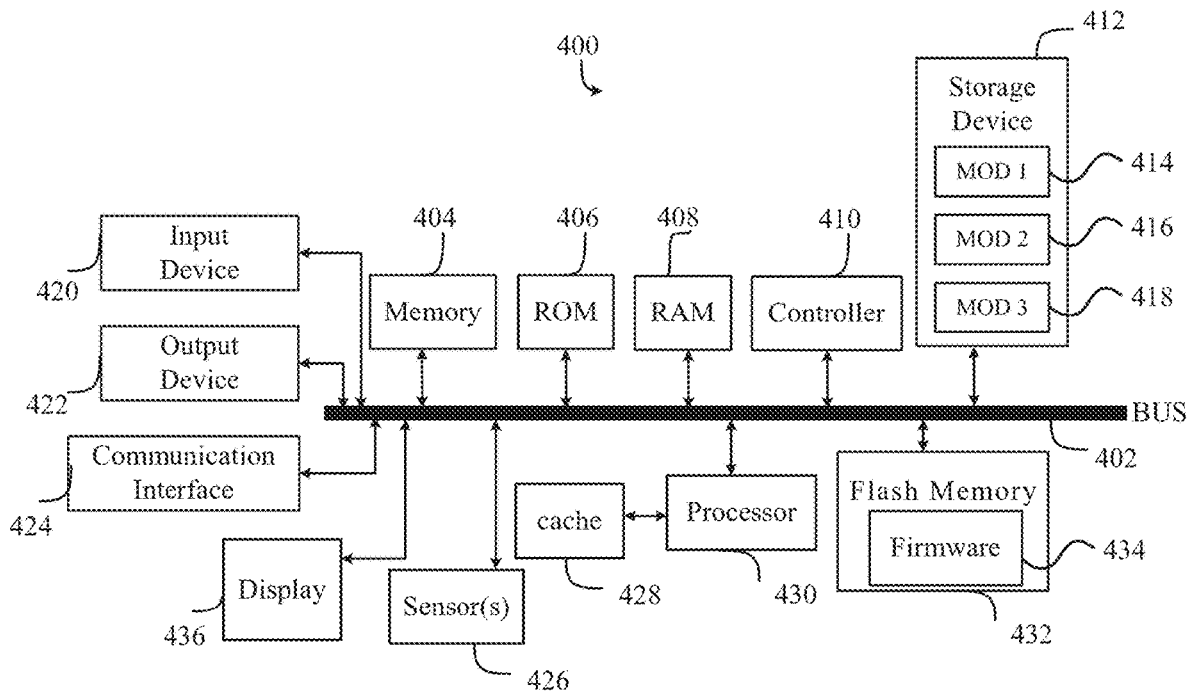
FIGS. 4 and 5 illustrate exemplary systems in accordance with various examples of the present disclosure.

In a network switch system, a lookup database can be maintained to keep track of routes between a number of end points attached to the switch system. However, end points can have various configurations and are associated with numerous tenants. These end-points can have various types of identifiers, e.g., IPv4, IPv6, or Layer-2. The lookup database has to be configured in different modes to handle different types of end-point identifiers. Some capacity of the lookup database is carved out to deal with different address types of incoming packets. Further, the lookup database on the network switch system is typically limited by 1K virtual routing and forwarding (VRFs). Therefore, an improved lookup algorithm is desired to handle various types of end-point identifiers. The disclosed technology addresses the need in the art for address lookups in a telecommunications network. Disclosed are systems, methods, and computer-readable storage media for unifying various types of end-point identifiers by mapping end-point identifiers to a uniform space and allowing different forms of lookups to be uniformly handled. A brief introductory description of example systems and networks, as illustrated in FIGS. 3 and 4, is disclosed herein. These variations shall be described herein as the various examples are set forth. The technology now turns to FIG. 3.

FIG. 3 illustrates an example computing device 300 suitable for implementing the present technology. Computing device 300 includes a master central processing unit (CPU) 362, interfaces 368, and a bus 315 (e.g., a PCI bus). When acting under the control of appropriate software or firmware, the CPU 362 is responsible for executing packet management, error detection, and/or routing functions, such as miscabling detection functions, for example. The CPU 362 preferably accomplishes all these functions under the control of software including an operating system and any appropriate applications software. CPU 362 can include one or more processors 363 such as a processor from the Motorola family of microprocessors or the MIPS family of microprocessors. In an alternative example, processor 363 is specially designed hardware for controlling the operations of the computing device 300. In a specific example, a memory 361 (such as non-volatile RAM and/or ROM) also forms part of CPU 362. However, there are many different ways in which memory could be coupled to the system.

The interfaces 368 are typically provided as interface cards (sometimes referred to as "line cards"). Generally, they control the sending and receiving of data packets over the network and sometimes support other peripherals used with the computing device 300. Among the interfaces that can be provided are Ethernet interfaces, frame relay interfaces, cable interfaces, DSL interfaces, token ring interfaces, and the like. In addition, various very high-speed interfaces can be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces can include ports appropriate for communication with the appropriate media. In some cases, they can also include an independent processor and, in some instances, volatile RAM. The independent processors can control such communications intensive tasks as packet switching, media control and management. By providing separate processors for the communications intensive tasks, these interfaces allow the master microprocessor 362 to efficiently perform routing computations, network diagnostics, security functions, etc.

Although the system shown in FIG. 3 is one specific computing device of the present technology, it is by no means the only network device architecture on which the present patent application can be implemented. For example, an architecture having a single processor that handles communications as well as routing computations, etc. is often used. Further, other types of interfaces and media could also be used with the router.

Regardless of the network device's configuration, it can employ one or more memories or memory modules (including memory 361) configured to store program instructions for the general-purpose network operations and mechanisms for roaming, route optimization and routing functions described herein. The program instructions can control the operation of an operating system and/or one or more applications, for example. The memory or memories can also be configured to store tables such as mobility binding, registration, and association tables, etc.

Figure 5:
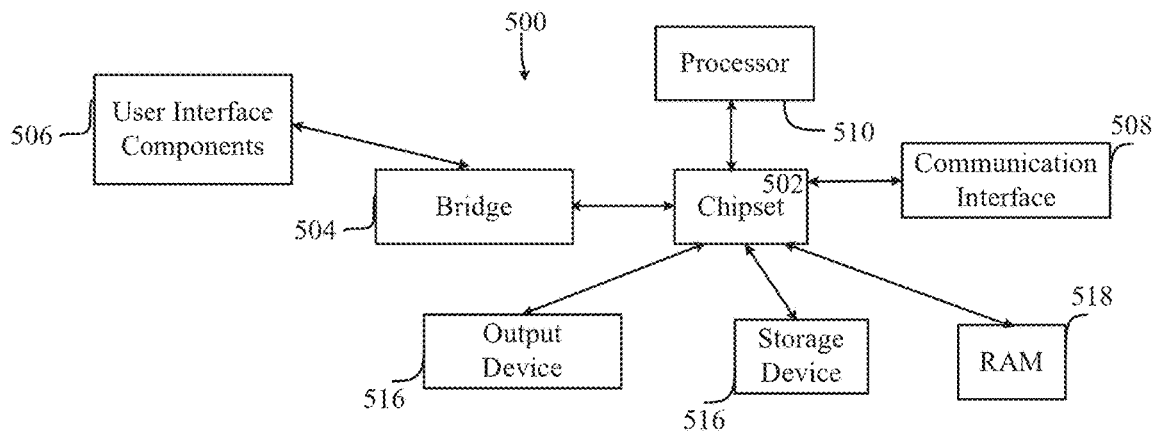

FIGS. 4 and 5 illustrate example system embodiments. The more appropriate embodiment will be apparent to those of ordinary skill in the art when practicing the present technology. Persons of ordinary skill in the art will also readily appreciate that other system embodiments are possible.

FIG. 4 illustrates a system bus computing system architecture 400 wherein the components of the system are in electrical communication with each other using a bus 402. Example system 400 includes a processing unit (CPU or processor) 430 and a system bus 402 that couples various system components including the system memory 404, such as read only memory (ROM) 406 and random access memory (RAM) 408, to the processor 430. The system 400 can include a cache of high-speed memory connected directly with, in close proximity to, or integrated as part of the processor 430. The system 400 can copy data from the memory 404 and/or the storage device 412 to the cache 428 for quick access by the processor 430. In this way, the cache can provide a performance boost that avoids processor 430 delays while waiting for data. These and other modules can control or be configured to control the processor 430 to perform various actions. Other system memory 404 may be available for use as well. The memory 404 can include multiple different types of memory with different performance characteristics. The processor 430 can include any general purpose processor and a hardware module or software module, such as module 1 414, module 2 416, and module 3 418 stored in storage device 412, configured to control the processor 430 as well as a special-purpose processor where software instructions are incorporated into the actual processor design. The processor 430 may essentially be a completely self-contained computing system, containing multiple cores or processors, a bus, memory controller, cache, etc. A multi-core processor may be symmetric or asymmetric.

To enable user interaction with the computing device 400, an input device 420 can represent any number of input mechanisms, such as a microphone for speech, a touch-sensitive screen for gesture or graphical input, keyboard, mouse, motion input, speech and so forth. An output device 422 can also be one or more of a number of output mechanisms known to those of skill in the art. In some instances, multimodal systems can enable a user to provide multiple types of input to communicate with the system 400. The communications interface 424 can generally govern and manage the user input and system output. There is no restriction on operating on any particular hardware arrangement and therefore the basic features here may easily be substituted for improved hardware or firmware arrangements as they are developed.

Storage device 412 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 408, read only memory (ROM) 406, and hybrids thereof.

The storage device 412 can include software modules 414, 416, 418 for controlling the processor 430. Other hardware or software modules are contemplated. The storage device 412 can be connected to the system bus 402. In one aspect, a hardware module that performs a particular function can include the software component stored in a computer-readable medium in connection with the necessary hardware components, such as the processor 430, bus 402, display 436, and so forth, to carry out the function.

The controller 410 can be a specialized microcontroller or processor on the system 400, such as a BMC (baseboard management controller). In some cases, the controller 410 can be part of an Intelligent Platform Management Interface (IPMI). Moreover, in some cases, the controller 410 can be embedded on a motherboard or main circuit board of the system 400. The controller 410 can manage the interface between system management software and platform hardware. The controller 410 can also communicate with various system devices and components (internal and/or external), such as controllers or peripheral components, as further described below.

The controller 410 can generate specific responses to notifications, alerts, and/or events and communicate with remote devices or components (e.g., electronic mail message, network message, etc.), generate an instruction or command for automatic hardware recovery procedures, etc. An administrator can also remotely communicate with the controller 410 to initiate or conduct specific hardware recovery procedures or operations, as further described below.

Different types of sensors (e.g., sensors 426) on the system 400 can report to the controller 410 on parameters such as cooling fan speeds, power status, operating system (OS) status, hardware status, and so forth. The controller 410 can also include a system event log controller and/or storage for managing and maintaining events, alerts, and notifications received by the controller 410. For example, the controller 410 or a system event log controller can receive alerts or notifications from one or more devices and components and maintain the alerts or notifications in a system even log storage component.

Flash memory 432 can be an electronic non-volatile computer storage medium or chip which can be used by the system 400 for storage and/or data transfer. The flash memory 432 can be electrically erased and/or reprogrammed. Flash memory 432 can include erasable programmable read-only memory (EPROM), electrically erasable programmable read-only memory (EEPROM), ROM, NVRAM, or complementary metal-oxide semiconductor (CMOS), for example. The flash memory 432 can store the firmware 434 executed by the system 400 when the system 400 is first powered on, along with a set of configurations specified for the firmware 434. The flash memory 432 can also store configurations used by the firmware 434.

The firmware 434 can include a Basic Input/Output System or its successors or equivalents, such as an Extensible Firmware Interface (EFI) or Unified Extensible Firmware Interface (UEFI). The firmware 434 can be loaded and executed as a sequence program each time the system 400 is started. The firmware 434 can recognize, initialize, and test hardware present in the system 400 based on the set of configurations. The firmware 434 can perform a self-test, such as a Power-on-Self-Test (POST), on the system 400. This self-test can test functionality of various hardware components such as hard disk drives, optical reading devices, cooling devices, memory modules, expansion cards and the like. The firmware 434 can address and allocate an area in the memory 404, ROM 406, RAM 408, and/or storage device 412, to store an operating system (OS). The firmware 434 can load a boot loader and/or OS, and give control of the system 400 to the OS.

The firmware 434 of the system 400 can include a firmware configuration that defines how the firmware 434 controls various hardware components in the system 400. The firmware configuration can determine the order in which the various hardware components in the system 400 are started. The firmware 434 can provide an interface, such as an UEFI, that allows a variety of different parameters to be set, which can be different from parameters in a firmware default configuration. For example, a user (e.g., an administrator) can use the firmware 434 to specify clock and bus speeds, define what peripherals are attached to the system 400, set monitoring of health (e.g., fan speeds and CPU temperature limits), and/or provide a variety of other parameters that affect overall performance and power usage of the system 400.

While firmware 434 is illustrated as being stored in the flash memory 432, one of ordinary skill in the art will readily recognize that the firmware 434 can be stored in other memory components, such as memory 404 or ROM 406, for example. However, firmware 434 is illustrated as being stored in the flash memory 432 as a non-limiting example for explanation purposes.

System 400 can include one or more sensors 426. The one or more sensors 426 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 426 can communicate with the processor, cache 428, flash memory 432, communications interface 424, memory 404, ROM 406, RAM 408, controller 410, and storage device 412, via the bus 402, for example. The one or more sensors 426 can also communicate with other components in the system via one or more different means, such as inter-integrated circuit (I2C), general purpose output (GPO), and the like.

FIG. 5 illustrates an example computer system 500 having a chipset architecture that can be used in executing the described method(s) or operations, and generating and displaying a graphical user interface (GUI). Computer system 500 can include computer hardware, software, and firmware that can be used to implement the disclosed technology. System 500 can include a processor 510, representative of any number of physically and/or logically distinct resources capable of executing software, firmware, and hardware configured to perform identified computations. Processor 510 can communicate with a chipset 502 that can control input to and output from processor 510. In this example, chipset 502 outputs information to output device 514, such as a display, and can read and write information to storage device 516, which can include magnetic media, and solid state media, for example. Chipset 502 can also read data from and write data to RAM 518. A bridge 504 for interfacing with a variety of user interface components 506 can be provided for interfacing with chipset 502. Such user interface components 506 can include a keyboard, a microphone, touch detection and processing circuitry, a pointing device, such as a mouse, and so on. In general, inputs to system 500 can come from any of a variety of sources, machine generated and/or human generated.

Chipset 502 can also interface with one or more communication interfaces 508 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 510 analyzing data stored in storage 516 or 518. Further, the machine can receive inputs from a user via user interface components 506 and execute appropriate functions, such as browsing functions by interpreting these inputs using processor 510.

Moreover, chipset 502 can also communicate with firmware 512, which can be executed by the computer system 500 when powering on. The firmware 502 can recognize, initialize, and test hardware present in the computer system 500 based on a set of firmware configurations. The firmware 512 can perform a self-test, such as a POST, on the system 500. The self-test can test functionality of the various hardware components 502-518. The firmware 512 can address and allocate an area in the memory 518 to store an OS. The firmware 512 can load a boot loader and/or OS, and give control of the system 500 to the OS. In some cases, the firmware 512 can communicate with the hardware components 502-510 and 514-518. Here, the firmware 512 can communicate with the hardware components 502-510 and 514-518 through the chipset 502 and/or through one or more other components. In some cases, the firmware 512 can communicate directly with the hardware components 502-510 and 514-518.

It can be appreciated that example systems 300, 400 and 500 can have more than one processor (e.g., 363, 430, 510) or be part of a group or cluster of computing devices networked together to provide greater processing capability.

For clarity of explanation, in some instances the present technology may be presented as including individual functional blocks including functional blocks including devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described herein.

Various aspects of the present technology provide systems and methods for enabling an administrator or a controller to update BIOS setup options on a server system and then automatically update the BIOS setup options on other server systems in the same BMC VLAN. While specific examples have been cited above showing how the optional operation can be employed in different instructions, other examples can incorporate the optional operation into different instructions. For clarity of explanation, in some instances the present technology can be presented as including individual functional blocks including functional blocks including devices, device components, steps or routines in a method embodied in software, or combinations of hardware and software.

The various examples can be further implemented in a wide variety of operating environments, which in some cases can include one or more server computers, user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

To the extent examples, or portions thereof, are implemented in hardware, the present patent application can be implemented with any or a combination of the following technologies: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Most examples utilize at least one network that would be familiar to those skilled in the art for supporting communications using any of a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network and any combination thereof.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these technologies can include hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

In examples utilizing a Web server, the Web server can run any of a variety of server or mid-tier applications, including HTTP servers, FTP servers, CGI servers, data servers, Java servers and business application servers. The server(s) can also be capable of executing programs or scripts in response requests from user devices, such as by executing one or more Web applications that can be implemented as one or more scripts or programs written in any programming language, such as Java®, C, C# or C++ or any scripting language, such as Perl, Python or TCL, as well as combinations thereof. The server(s) can also include database servers, including without limitation those commercially available from open market.

The server system can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system can also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate examples can have numerous variations from that described above. For example, customized hardware might also be used and/or particular elements might be implemented in hardware, software (including portable software, such as applets) or both. Further, connection to other computing devices such as network input/output devices can be employed.

Storage media and computer readable media for containing code, or portions of code, can include any appropriate media known or used in the art, including storage media and computing media, such as but not limited to volatile and non-volatile, removable and non-removable media implemented in any method or technology for storage and/or transmission of information such as computer readable instructions, data structures, program modules or other data, including RAM, ROM, EPROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the technology and teachings provided herein, a person of ordinary skill in the art will appreciate other ways and/or methods to implement the various aspects of the present technology.

The specification and drawings are, accordingly, to be regarded in an illustrative rather than a restrictive sense. It will, however, be evident that various modifications and changes can be made thereunto without departing from the broader spirit and scope of the patent application as set forth in the claims.

What is claimed is:

1. A computer-implemented method for automatically broadcasting a basic input/output system (BIOS) setup option among a plurality of nodes in a virtual local-area network (VLAN), comprising:
    receiving, at a specific microcontroller of a node of the plurality of nodes, a command to update a BIOS setup option on the node;
    determining that the specific microcontroller is neither a master nor a slave based upon an internal flag of the specific microcontroller;
    broadcasting a master request to the VLAN that is in the same as the VLAN of the specific controller;
    determining that no response to the master request is received within a predetermined time period;
    setting the internal flag of the specific microcontroller as the master; and
    sending out a first completion response to indicate that the specific microcontroller is the master and is enabled to broadcast updated BIOS setup option on the node to the VLAN that is in the same as the VLAN of the specific controller.

2. The computer-implemented method of claim 1, further comprising:
    saving the updated BIOS setup option on the node;
    triggering a system management interrupt (SMI) prior to resetting the node; and
    causing a SMI handler to get variables of BIOS setup options and send the variables to the specific microcontroller.

3. The computer-implemented method of claim 2, further comprising:
    determining that the specific microcontroller is the master based upon the internal flag;
    broadcasting the updated BIOS setup option to the VLAN;
    setting the internal flag of the specific microcontroller to none;

sending out a second completion response to indicate that the updated BIOS setup option has been broadcasted; and resetting the node.

4. The computer-implemented method of claim 2, further comprising:

determining that the internal flag indicates the specific microcontroller as the slave or none; and resetting the node.

5. The computer-implemented method of claim 2, wherein the variables comprise a unified extensible firmware interface (UEFI) variable.

6. The computer-implemented method of claim 5, wherein the variables are sent from the SMI handler to the specific microcontroller via an Intelligent Platform Management Interface (IPMI) protocol.

7. The computer-implemented method of claim 1, further comprising:

determining that the specific microcontroller is the master; and sending out a third completion response to indicate that the specific microcontroller is already the master and is enabled to broadcast updated BIOS setup option on the node to the VLAN.

8. The computer-implemented method of claim 1, further comprising:

determining that the specific microcontroller is the slave; and sending out a fourth completion response to indicate that the specific microcontroller is the slave and is not ready to broadcast the updated BIOS setup option.

9. The computer-implemented method of claim 1, further comprising:

determining that at least one response to the master request is received within the predetermined time period;

setting the internal flag of the specific microcontroller as the slave; and sending out a fifth completion response to indicate that the specific microcontroller is the slave and is not ready to broadcast the updated BIOS setup option.

10. The computer-implemented method of claim 1, wherein the command is an OEM Intelligent Platform Management Interface (IPMI) command indicating the specific microcontroller as the master to broadcast the updated BIOS setup option.

11. The computer-implemented method of claim 1, further comprising:

providing a BIOS setup utility for an administrator to update the BIOS setup option on the node.

12. The computer-implemented method of claim 1, further comprising:

causing another node of the plurality of nodes to be powered on;

causing the another node to receive the updated BIOS setup option from the specific microcontroller;

causing Power-on-Self-Test (POST) of the another node to get the updated BIOS setup option to overwrite an existing BIOS setup option on the another node; and causing the POST to continue on the another node.

13. The computer-implemented method of claim 1, wherein the first completion response is sent to a unified extensible firmware interface (UEFI) shell interface.

14. A server system, comprising:

a processor; and a non-transitory computer-readable medium storing instructions that, when executed by the processor, cause the server system to perform operations comprising:

receiving, at a specific microcontroller of a node of a plurality of nodes in a virtual local-area network (VLAN), a command to update a BIOS setup option on the node;

determining that the specific microcontroller is neither a master nor a slave based upon an internal flag of the specific microcontroller;

broadcasting a master request to the VLAN that is in the same as the VLAN of the specific controller;

determining that no response to the master request is received within a predetermined time period;

setting the internal flag of the specific microcontroller as the master; and sending out a first completion response to indicate that the specific microcontroller is the master and is enabled to broadcast updated BIOS setup option on the node to the VLAN that is in the same as the VLAN of the specific controller.

15. The server system of claim 14, wherein the instructions, when executed by the processor, cause the system to perform operations comprising:

saving the updated BIOS setup option on the node;

triggering a system management interrupt (SMI) prior to resetting the node; and causing a SMI handler to get variables of BIOS setup options and send the variables to the specific microcontroller.

16. The server system of claim 15, wherein the instructions, when executed by the processor, cause the system to perform operations comprising:

determining that the specific microcontroller is the master based upon the internal flag;

broadcasting the updated BIOS setup option to the VLAN;

setting the internal flag of the specific microcontroller to none;

sending out a second completion response to indicate that the updated BIOS setup option has been broadcasted; and resetting the node.

17. The server system of claim 15, wherein the instructions, when executed by the processor, cause the system to perform operations comprising:

determining that the internal flag indicates the specific microcontroller as the slave or none; and resetting the node.

18. The server system of claim 14, wherein the instructions, when executed by the processor, cause the system to perform operations comprising:

determining that at least one response to the master request is received within the predetermined time period;

setting the internal flag of the specific microcontroller as the slave; and sending out a fifth completion response to indicate that the specific microcontroller is the slave and is not ready to broadcast the updated BIOS setup option.

19. The server system of claim 14, wherein the instructions, when executed by the processor, cause the system to perform operations comprising:

providing a BIOS setup utility for an administrator to update the BIOS setup option on the node.

20. The server system of claim 14, wherein the instructions, when executed by the processor, cause the system to perform operations comprising:
   causing another node of the plurality of nodes to be powered on;
   causing the another node to receive the updated BIOS setup option from the specific microcontroller;
   causing Power-on-Self-Test (POST) of the another node to get the updated BIOS setup option to overwrite an existing BIOS setup option on the another node; and
   causing the POST to continue on the another node.

\* \* \* \* \*